United States Patent [19]
van Osenbruggen et al.

[11] 4,013,863
[45] Mar. 22, 1977

[54] METHOD OF FINISHING A WORKPIECE OF A NON-CONDUCTING MATERIAL, PARTICULARLY DIAMOND, BY MEANS OF SPARK EROSION

[75] Inventors: Cornelis van Osenbruggen; Johannes van Ruler; Theodorus Maria Berendina Schoenmakers, all of Eindhoven, Netherlands

[73] Assignee: U.S. Philips Corporation, New York, N.Y.

[22] Filed: Nov. 3, 1975

[21] Appl. No.: 628,090

Related U.S. Application Data

[63] Continuation of Ser. No. 471,041, May 17, 1974, abandoned, which is a continuation-in-part of Ser. No. 437,324, Jan. 28, 1974, abandoned.

[30] Foreign Application Priority Data

Feb. 7, 1973 Netherlands ............... 7301683

[52] U.S. Cl. .................... 219/69 D; 219/69 M
[51] Int. Cl.² ........................................ B23P 1/08
[58] Field of Search ............ 219/69 D, 69 M, 69 V, 219/69 R

[56] References Cited

UNITED STATES PATENTS

| | | | |
|---|---|---|---|
| 2,258,480 | 10/1941 | Bergmann et al. | 219/69 M |
| 2,377,159 | 5/1945 | Kurtz et al. | 219/69 V |
| 2,438,941 | 4/1948 | Peters et al. | 219/69 V |
| 2,476,965 | 7/1949 | Emerson et al. | 219/69 M |
| 2,939,941 | 6/1960 | Heerschap et al. | 219/69 M |
| 2,996,602 | 8/1961 | Webb | 219/69 D |
| 3,334,210 | 8/1967 | Williams et al. | 219/69 D |
| 3,639,275 | 2/1972 | Stayner | 219/69 D |
| 3,648,013 | 3/1972 | Stayner et al. | 219/69 D |
| 3,723,690 | 3/1973 | Nakade et al. | 219/69 M |

Primary Examiner—Bruce A. Reynolds
Attorney, Agent, or Firm—Frank R. Trifari; Norman N. Spain

[57] ABSTRACT

Spark erosion is applied to a non-conducting workpiece while employing a dielectric liquid comprising an emulsion of an aqueous solution of an electrolyte in an organic liquid and a surfactant.

4 Claims, No Drawings

METHOD OF FINISHING A WORKPIECE OF A NON-CONDUCTING MATERIAL, PARTICULARLY DIAMOND, BY MEANS OF SPARK EROSION

This is a continuation, division, of application Ser. No. 471,041, filed May 17, 1974, abandoned, which is a continuation-in-part of U.S. patent application Ser. No. 437,324, filed Jan. 28, 1974, abandoned.

The invention relates to a method of finishing a workpiece of a non-conducting material, particularly diamond, by means of spark erosion in which a voltage is applied between the surface of the workpiece present in a dielectric liquid and an electrode likewise present in the said liquid, and this in such a manner that spark-over is effected between the workpiece and the electrode.

Such a method is known, for example, from U.S. Pat. Spec. No. 3,939,941. According to this patent specification a diamond to be finished is provided with a conducting coating of graphite by heating the diamond in a non-oxidizing flame until the temperature of conversion to graphite is reached and by subsequently cooling it carefully under non-oxidizing circumstances. The entire surface of the diamond is converted into graphite in this manner. Of course it is alternatively possible to provide the surface of the diamond with a conducting coating of carbon in a pyrolytic manner in an atmosphere comprising a carbon compound.

In the known method voltage pulses are applied by means of an RC relaxation circuit in combination with a spark gap between an electrode supported by the conducting coating and the conducting surface. The diamond is present in a dielectric liquid.

The temperature at the area of contact rapidly increases due to direct passage of current to such a high value that the graphite coating evaporates. At the instant when the graphite coating between the electrode and the diamond has disappeared a spark-over is effected on the bare surface of the diamond. The temperature locally increases to more than 3000° C so that a crater-like aperture is provided in the diamond surface due to evaporation. The bottom of the crater-like aperture consists of graphite because the temperature at that area has been above 1700° C (conversion temperature diamond-graphite). The electrode is then supported by the newly formed graphite coating whereafter the process is repeated.

The dielectric liquid serves to limit the extension of the spark gap so that high current densities can be produced between the electrode and the workpiece and furthermore it serves as a coolant and as a transporting agent for the particles which have come off the workpiece and the electrode. As such petroleum, kerosine, tetrachlorocarbon, trichloroethylene, tetraline and olive oil and paraffin oil are used. These are generally liquids which are non-conducting until the breakdown field strength is achieved, which deionize rapidly after breakdown, are fluid and have a high flash point.

The known method has a number of drawbacks. Spark-over is generally only effected at a comparatively high voltage. As a result much discharge energy is released at each spark-over so that the finished surfaces are comparatively rough. The accuracy of the shape leaves to be desired and in case of diamond it is also dependent on the crystal orientation.

The graphite coating formed during spark-over is not regular in diamond and as a result preferred current paths for the depletion of the charge are produced which cause so-called wear grooves in the workpiece.

The electrode used for the method is exposed to great wear. Apertures of slight dimensions cannot be obtained; electrodes having the small diameter necessary for this purpose are deformed when they are pressed against the surface to be finished with a force which is necessary for the process.

An object of the invention is to improve the known method in such a manner that its drawbacks can be obviated.

According to the invention this is achieved by a method which is characterized in that the finishing operation is performed by means of spark erosion in a dielectric liquid comprising a surface-active material and an aqueous electrolyte solution in a solubilized state.

Solubilisation is understood to mean the dissolution of a material in a solvent in which the material is normally insoluble. The so-called solubilisate, in the present case the aqueous electrolyte solution is taken up in micelles formed by a surface-active material. The concentration of the surface-active material in the dielectric liquid must of course be larger than the critical micelle concentration. The conventional dielectric liquids some examples of which have already been mentioned may be used.

The emulsion used in the method according to the invention is transparent or semitransparent because the emulsified electrolyte solution drops have dimensions which are smaller than the wavelength of visible light. This liquid is hereinafter referred to as "micro-emulsion". The quantity of electrolyte solution which can be distributed in the dielectric liquid under formation of a micro-emulsion is dependent on the concentration of the surface-active material and may be easily determined by experiment from case to case. However, experiments have proved that the quantity of electrolyte solution must be not more than 10% by volume calculated on the quantity of dielectric liquid and preferably less than 5% by volume. There is a usable effect at quantities as from approximately 0.5% by volume. The electrical resistance of the micro-emulsion only deviates to a slight extent from the electrical resistance of the continuous phase constituted by the dielectric liquid. The breakdown field strength is, however, lower than that of the dielectric liquid.

An important advantage of the method according to the invention is that it is not necessary to rest the electrode on the surface to be finished, let alone to press it against the surface. As a result a greater accuracy of shape of the aperture to be made is achieved. Another advantage emanating therefrom is that apertures of a smaller diameter can be obtained as compared with the known method because the rigidity of the electrode only plays a minor role.

The micelles present in the micro-emulsion and comprising the solubilisate move in the electrical field between the electrode and the diamond to areas where the highest field strength occurs. As a result the field strength in the dielectric liquid is locally further increased. A quick breakdown is effected due to the avalanche-like increase of the field strength between electrode and diamond. A second very surprising effect of the micro-emulsion is that the newly formed surface of the workpiece has such a satisfactory conductance that the formation of preferred current paths and wear grooves is effectively avoided. This is probably caused by the fact that upon breakdown the solubilisate is released from the micelles and spreads over the non-conducting surface, wets it and repels the dielectric liquid from the surface and thus constitutes a conducting coating on the non-conducting surface of the workpiece. In addition the finishing time is shorter while the wear of the electrode is reduced. The crystal orientation of the diamond is found to be of no influence on the accuracy of the shape.

The method according to the invention may be used for all operations which can be performed by means of spark erosion such as drilling holes, drilling cylinders with hollow electrodes, sawing with wire-shaped electrodes and the like.

Experiments have shown that when using a normal emulsion in which the electrolyte solution is not taken up in micelles constituted by the surface-active material and in which the emulsified electrolyte solution drops have a diameter of more than 1 $\mu$m the effect envisaged by the invention also occurs at first. However, under the circumstances occurring during the operation due to spark erosion such an emulsion is found to flocculate so that it will quickly be rendered unsuitable.

The micro-emulsions to be used in the method according to the invention can generally be obtained with surface-active materials such as alkyl-ammonium salts, salts of amines having a $C_{12}$ or longer alkyl chain, soaps of alkylamines, sulphosuccinates, alkylaryl sulphonates, non-ionic surface-active materials whose hydrophilic part consists of a polyoxyethylene chain and whose hydrophobic part may comprise an alkyl or an alkylaryl chain.

Table I states a number of surface-active materials accompanied by the HLB number and trade name with which suitable micro-emulsions can be prepared. The HLB number (Hydrophile-Lypophile Balance) is a measure of the ratio between the gravitational forces exerted by the two phases (generally oil and water) on a surface-active material. (POE in the table refers to polyoxyethylene).

sine. 18ml of an NaOH solution (1M) in water were added to this solution whereafter stirring took place for such a period until a transparent liquid was obtained.

Micro-emulsion B.

20 g. of di-(2-ethylhexyl)-sodiumsulphosuccinate (Aerosol -OT) having a HLB number of 13.5 were dissolved in 600 ml of kerosine. 18 ml of NaOH solution (1M) in water were added to this solution whereafter stirring took place for such a period until a transparent liquid was obtained.

Micro-emulsion C.

20 g of di-(2-ethylhexyl)-sodiumsulphosuccinate having a high HLB number of 13.5 were dissolved in 600 ml of kerosine. 18 ml of $H_2SO_4$ solution (1M) in water were added to this liquid whereafter stirring took place for such a period until a transparent liquid was obtained.

Micro-emulsion D.

40 g of polyoxyethylene lauryl ether having a HLB number of 9.7 were dissolved in 600 ml of kerosine. 18 ml of $H_2SO_4$ solution (0.1 M) in water were added to this solution whereafter stirring took place for such a period until a transparent liquid was obtained.

EXAMPLE II.

Apertures were drilled in diamond by means of spark erosion while using the following liquids: kerosine, kerosine with surface-active material, kerosine with surface-active material and water, liquids A, B, C and D.

Table II shows the results of these experiments. A conical aperture was drilled in the surface of a diamond up to a depth of 0.4 mm and an apex angle of 30°. The first column states the dielectric liquid used, the second column states the required time and the third column states the relative volume wear in percents of the electrode. Subsequently a conical aperture was drilled in the bottom of this aperture with an apex angle of 14°. The fourth column states the out-of-roundness of the transition from the first to the second aperture (average diameter, largest deviation therefrom and the

TABLE I.

| Surface-active material | HLB number | trade name | firm |
|---|---|---|---|
| POE-lauryl ether | 9.7 | Bry 30 | Atlas Chem. Ind. |
| POE-sorbitol monooleate | 10.0 | Tween 81 | Atlas Chem. Ind. |
| POE-sorbitol hexaoleate | 10.2 | G-1086 | Atlas Chem. Ind. |
| POE-sorbitol tristearate | 10.5 | Tween 65 | Atlas Chem. Ind. |
| POE-sorbitol pentalaurate | 9.7 | G-1061 | Atlas Chem. Ind. |
| POE-oleylether | 12.4 | G-3910 | Atlas Chem. Ind. |
| POE-sorbitol esters of mixture of fatty and resin acids | | | |
| Na-di(2-ethylhexyl) sulphosuccinate | 13.5 | Aerosol OT | Amer. Cyanamid Co. |
| Na-ditridecylsulphosuccinate | — | Aerosol TR | Amer. Cyanamic Co. |

The invention will now further be described with reference to some examples:

EXAMPLE I

Preparation of dielectric liquids suitable for the method according to the invention:

Micro-emulsion A.

30 g of polyoxyethylene sorbitol hexaoleate having a HLB number of 10.2 were dissolved in 600 ml of keroshape). The fifth and the sixth column give a visual assessment of the surface roughness of the walls of the conical apertures having apex angles of 30° and 14°. The spark erosion was performed while using a spark generator having a pulsatory voltage of 800 volt, a pulsatory current of 4 Amp., pulse duration 1 $\mu$ sec, and a pulse frequency of 2.5 kHz. The electrode consisted of a pointed tungsten wire.

TABLE II.

| Dielectric liquid | Sparking time in seconds | Wear in % | out-of-roundness μm | deviation μm | shape | surface roughness 30° aperture | 140° aperture |
|---|---|---|---|---|---|---|---|
| kerosine | 155 | 5 | 235 | 10 | hexagonal | medium | coarse |
| liquid I | 71.5 | 5 | 235 | 10 | hexagonal | medium | medium to coarse |
| liquid II | 42 | 0.6 | 200 | 7 | hexagonal | medium to fine | medium to coarse |
| micro-emulsion A | 33 | 1.1 | 230 | <3 | round | medium to fine | medium to fine |
| micro-emulsion B | 70 | 1.5 | 180 | <3 | round | fine | fine |
| micro-emulsion C | 45 | 1.2 | 180 | <3 | round | fine | fine |
| micro-emulsion D | 31 | 0.6 | 220 | <3 | round | medium to fine | medium to fine. |

Liquid I: 600 ml of kerosine in which 15 g of polyoxyethylene laurylether having a HLB number of 9.7 are dissolved.
Liquid II: 600 ml of kerosine in which 30 g of polyoxyethylene laurylether having a HLB number of 9.7 1and 18 ml of water are dissolved.

What is claimed is:

1. In the method of finishing a workpiece of a non-conducting material by means of spark erosion in which a voltage is applied between the surface of the workpiece present in a dielectric liquid and an electrode also present in the dielectric liquid to effect a spark-over between the workpiece and the electrode, the improvement wherein said dielectric liquid is an emulsion of an aqueous solution of an electrolyte in an organic dielectric liquid and a surfactant, the drops of said emulsion being smaller than the wavelength of visible light.

2. The method of claim 1 wherein the non-conducting material is diamond.

3. The method of claim 2 wherein the dielectric liquid contains 0.5 to 5% by volume of the aqueous solution of an electrolyte based on the quantity of the organic dielectric liquid.

4. The method of claim 1 wherein the dielectric liquid contains 0.5 to 10% by volume of the aqueous solution of an electrolyte based on the quantity of the organic dielectric liquid.

* * * * *